US008939627B2

(12) United States Patent
Yatsuda

(10) Patent No.: US 8,939,627 B2
(45) Date of Patent: Jan. 27, 2015

(54) VEHICLE LIGHTING UNIT

(75) Inventor: Yasushi Yatsuda, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 185 days.

(21) Appl. No.: 13/562,282

(22) Filed: Jul. 30, 2012

(65) Prior Publication Data

US 2013/0107564 A1 May 2, 2013

(30) Foreign Application Priority Data

Jul. 29, 2011 (JP) ................................ 2011-166163
Jul. 29, 2011 (JP) ................................ 2011-166164

(51) Int. Cl.
*B60Q 1/00* (2006.01)
*F21S 8/10* (2006.01)

(52) U.S. Cl.
CPC ............ *F21S 48/32* (2013.01); *F21S 48/1159* (2013.01); *F21S 48/1258* (2013.01); *F21S 48/1388* (2013.01); *F21S 48/145* (2013.01); *F21S 48/1747* (2013.01); *F21S 48/321* (2013.01); *F21S 48/328* (2013.01)
USPC ................ 362/547; 362/249.02; 362/249.05; 362/294; 362/545

(58) Field of Classification Search
USPC ............... 362/249.02, 249.05, 294, 545, 547
See application file for complete search history.

(56) References Cited

U.S. PATENT DOCUMENTS 7,237,935 B2 * 7/2007 Ito et al. ....................... 362/547

FOREIGN PATENT DOCUMENTS

JP 4523055 B2 6/2010

* cited by examiner

*Primary Examiner* — Stephen F Husar
(74) *Attorney, Agent, or Firm* — Kenealy Vaidya LLP

(57) ABSTRACT

A vehicle lighting unit can not only promote the dissipation of heat from a semiconductor light emitting device and a drive circuit for the device, both of which are the heat generation members, but also improve its maintenance workability. The vehicle lighting unit can include a light source module having a module main body. The module main body can include first and second semiconductor light emitting devices, drive circuits configured to drive and control the first and second semiconductor light emitting devices, and a heat dissipation fin for dissipating heat generated by the semiconductor light emitting devices and the drive circuits. Both the semiconductor light emitting devices and the drive circuit are directly attached to the module main body.

25 Claims, 8 Drawing Sheets

VEHICLE LIGHTING UNIT

This application claims the priority benefit under 35 U.S.C. §119 of Japanese Patent Application No. 2011-166163 filed on Jul. 29, 2011 and Japanese Patent Application No. 2011-166164 filed on Jul. 29, 2011, which are hereby incorporated in their entirety by reference.

TECHNICAL FIELD

The presently disclosed subject matter relates to a vehicle lighting unit for use in, for example, vehicle headlamps and the like.

BACKGROUND ART

Some conventional vehicle lighting units for use in a vehicle headlamp utilize a semiconductor light emitting device as a light source. Examples of such a semiconductor light emitting device include a light emitting diode (LED), a semiconductor laser, and the like. Recently, as the optical performance of such an LED is improved, the use of the semiconductor light emitting device like an LED as a light source for such a vehicle headlamp is increasing. Hereinafter, such a vehicle lighting unit will be described with taking a headlamp as an example.

In general, this type of a vehicle headlamp can include a semiconductor light emitting device, a drive circuit configured to drive and control the semiconductor light emitting device, and a heat dissipation member configured to dissipate heat generated by the semiconductor light emitting device and the drive circuit. The drive circuit may be provided outside the lighting unit so as to be exposed in terms of the improvement in the heat dissipation efficiency and the maintenance and/or replacement workability.

Specifically, a reference is made to Japanese Patent No. 4523055, which describes a vehicle headlamp as shown in FIG. 1. As shown in FIG. 1, the vehicle headlamp can be composed of a light source module 80, a reflector 84 provided for cover over the light source module 80, a seat 85 on which the light source module 80 is mounted, a projector lens 86, and the like. The light source module 80 can include an LED 81, a drive circuit 82, and a metal substrate 83 on which the LED 81 and the drive circuit 82 are mounted so that they are integrated to constitute the light source module 80 as a unit. The drive circuit 82 can be exposed outside the reflector 84 that covers the LED 81 from above. A heat dissipation member such as a heat sink (not illustrated) can be attached to the seat 85, and the metal substrate 83 of the light source module 80 can be secured to the seat 85 so that heat from the metal substrate 83 can be conducted to the heat dissipation member. With this configuration, the heat generated by the LED 81 and the drive circuit 82 when the lighting unit is operated can be conducted to the heat dissipation member via the metal substrate 83 and the seat 85, thereby enhancing the effective dissipation of heat through the heat dissipation member.

The vehicle headlamp described in Japanese Patent No. 4523055 can have the structure in which the LED 81 and the drive circuit 82 are mounted on the metal substrate 83, and the generated heat can be dissipated through the metal substrate 83. In this structure, however, the heat from the LED 81 in a relatively larger amount may be conducted to the drive circuit 82 through the metal substrate 83 even when the drive circuit 82 also functions as a heat generation member. Specifically, the effective dissipation of heat generated by the LED 81 cannot be promoted while the temperature rise of the drive circuit 82 inevitably occurs. As a result, there is a possibility that the lifetime of the drive circuit 82 and/or the reliability thereof may deteriorate.

In some cases, an insulation grease or other coatings can be interposed between the metal substrate 83 and the seat 85 in order to enhance the insulation property therebetween. In this case, a heat-transfer resistance between the metal substrate 83 and the seat 85, which are parts of the heat dissipation path, can be increased by the intervention of such a coating. Due to the remarkable deterioration of the effect of the heat dissipation path, the heat from the LED 81 can be further conducted to the drive circuit 82, thereby causing the temperature rise of the circuit 82 to occur with ease.

Furthermore, the vehicle headlamp described in Japanese Patent No. 4523055 is configured such that the light source module 80 is fixed onto the seat 85 having a heat dissipation member (not-illustrated) in order to promote the heat dissipation of the LED 81 and the drive circuit 82. The structure as described above may hinder easy replacement of the LED 81 in the light source module 80 from the rear side of the headlamp as compared to the lighting unit utilizing, for example, a bulb as a light source. This means that maintenance workability may deteriorate.

SUMMARY

The presently disclosed subject matter was devised in view of these and other problems and features and in association with the conventional art. According to an aspect of the presently disclosed subject matter, there is provided a vehicle lighting unit that can promote the dissipation of heat from a semiconductor light emitting device such as an LED and heat from a drive circuit for the semiconductor light emitting device, both of which are the heat generation members, more effectively and/or differently as compared to the conventional lighting unit.

Furthermore, according to another aspect of the presently disclosed subject matter, there is provided a vehicle lighting unit that can not only promote dissipation of heat from a semiconductor light emitting device such as an LED and heat from a drive circuit for the semiconductor light emitting device, both of which are the heat generation members, more effectively but can also improve its maintenance workability as compared to the conventional lighting unit.

According to still another aspect of the presently disclosed subject matter, a vehicle lighting unit can include: a semiconductor light emitting device; a drive circuit configured to drive and control the semiconductor light emitting device; and a heat dissipation member to which both the semiconductor light emitting device and the drive circuit are directly attached in order to dissipate heat generated by the semiconductor light emitting device and the drive circuit.

In the vehicle lighting unit with the above configuration, the drive circuit can be sealed with a resin.

In the vehicle lighting unit with the above configuration, the heat dissipation member can include a front surface where a recessed portion having a bottom is formed, an extension portion extending forward from the bottom of the recessed portion, and a rear surface where a heat dissipation fin is formed, which can all be integrally formed. The semiconductor light emitting device can be attached to the extension portion, and the drive circuit can be attached within the recessed portion.

In the vehicle lighting unit with the above configuration, the heat dissipation member can include an extension portion configured to extend forward, the semiconductor light emitting device can include a first semiconductor light emitting device configured to form a low-beam light distribution pattern, and a second semiconductor light emitting device configured to form a high-beam light distribution pattern, and the extension portion can have an upper surface to which the first semiconductor light emitting device is attached and a lower surface to which the second semiconductor light emitting device is attached.

In a vehicle lighting unit made in accordance with principles of the presently disclosed subject matter, the semiconductor light emitting device and the drive circuit which are the heat generation members can be directly attached to the heat dissipation member to dissipate the generated heat. When compared with the conventional lighting unit in which the heat generated by the semiconductor light emitting device and the drive circuit is dissipated with the intervention of the metal substrate, the lighting unit of the presently disclosed subject matter can prevent the heat from the semiconductor light emitting device from being conducted to the drive circuit and can cause the heat to be directly conducted together with the heat from the drive circuit to the heat dissipation member, thereby effectively dissipating heat from the heat dissipation member. Therefore, the semiconductor light emitting device and the drive circuit can be effectively cooled by heat dissipation as compared to the conventional lighting unit.

According to yet another aspect of the presently disclosed subject matter, a vehicle lighting unit can include: a light source module having a first semiconductor light emitting device and a second semiconductor light emitting device, a drive circuit configured to drive and control the first and second semiconductor light emitting devices, a heat dissipation member configured to dissipate heat generated by the first and second semiconductor light emitting devices and the drive circuit, and an extension portion extending forward and having an upper surface to which the first semiconductor light emitting device is attached and a lower surface to which the second semiconductor light emitting device is attached in order to cause the first and second semiconductor light emitting devices to form independent light distribution patterns; an optical system configured to project light emitted from the first and second semiconductor light emitting devices forward; and a holding member configured to hold the optical system and detachably hold the light source module at its rear end.

In the vehicle lighting unit with the above configuration, the light source module can be attached to and removed from the rear end of the holding member in a front-to-rear direction.

In the vehicle lighting unit with the above configuration, the first and second semiconductor light emitting devices can be positioned with respect to the optical system by fitting the light source module to the holding member.

In the vehicle lighting unit with the above configuration, the light source module can include a cylindrical flange portion with a thin thickness in the front-to-rear direction. The holding member can include a circular fit portion at the rear end to be fit to the flange portion. The flange portion can include a plurality of engagement portions in its peripheral edge (outer peripheral edge) at irregular pitches. The fit portion can include a plurality of engagement portions in its peripheral edge (inner peripheral edge) at pitches corresponding to the irregular pitches so that the plurality of engagement portions of the flange portion can be fit to the corresponding engagement portions of the fit portion.

In the vehicle lighting unit with the above configuration, the first semiconductor light emitting device can be configured to form a low-beam light distribution pattern, and the second semiconductor light emitting device can be configured to form a high-beam light distribution pattern.

In the vehicle lighting unit with the above configuration, the second semiconductor light emitting device can be arranged in an inclined state so that its light emission surface is directed forward and obliquely downward.

In the vehicle lighting unit with the above configuration, the second semiconductor light emitting device can be disposed in a more forward position as compared to the position of the first semiconductor light emitting device.

In a vehicle lighting unit made in accordance with principles of the presently disclosed subject matter, the semiconductor light emitting devices and the drive circuit which are the heat generation members can be united as a light source module together with the heat dissipation member to dissipate generated heat. Furthermore, the light source module can be attached to and removed from the rear end of the holding member for holding the optical system. When compared with the conventional lighting unit in which the optical module consists only of the semiconductor light emitting device and the drive circuit is fixed to a separate part having a heat dissipation member, the lighting unit of the presently disclosed subject matter can cause heat generated by the semiconductor light emitting devices and the drive circuit to be appropriately dissipated solely by the configuration within the light source module.

Since the light source module can be removed from the holding member rearward, the semiconductor light emitting devices and/or the drive circuit can be easily replaced with new/replacement ones. This can enhance the maintenance workability as compared to the conventional lighting unit while the heat generated by the semiconductor light emitting devices and the drive circuit can be appropriately dissipated.

It should be appreciated that examples of the semiconductor light emitting device can include a light emitting diode (LED), a semiconductor laser, and the like.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings in accordance with exemplary embodiments. Note that the following exemplary embodiments show a vehicle headlamp as an example of the vehicle lighting unit, but this is not limitative.

Figure 1:
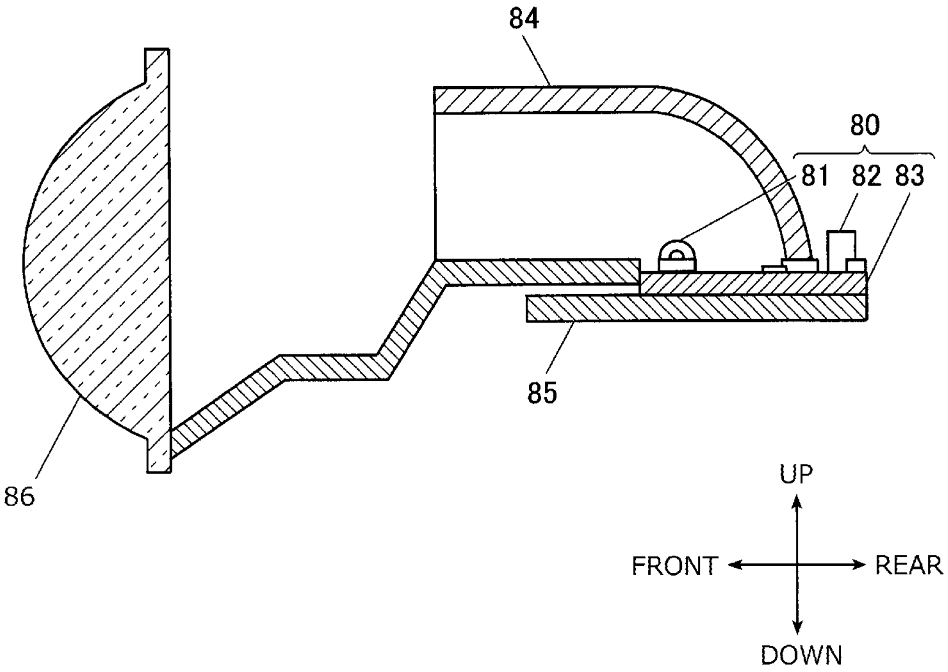
Fig. 1 Conventional Art
FIG. 1 is a cross-sectional side view illustrating a conventional vehicle headlamp.
Figure 2:
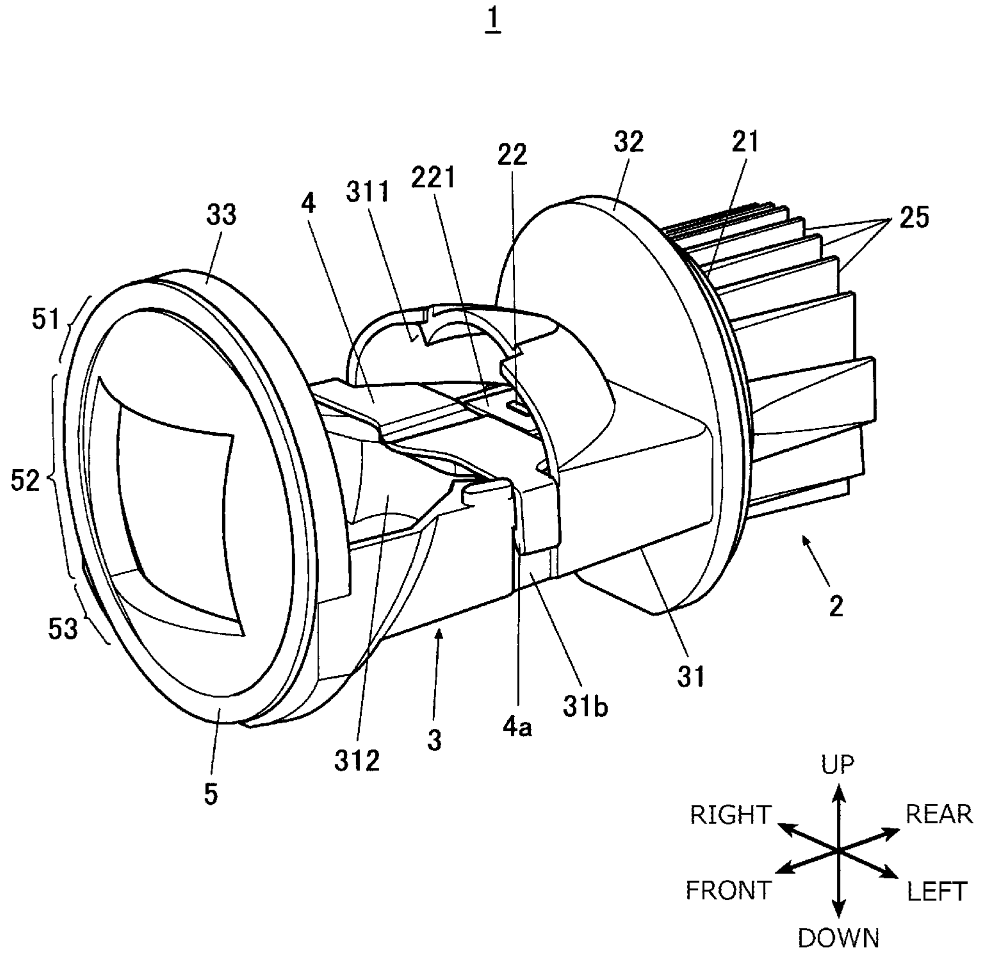
FIG. 2 is a perspective view illustrating a vehicle headlamp as one exemplary embodiment of a vehicle lighting unit made in accordance with principles of the presently disclosed subject matter.
Figure 3:
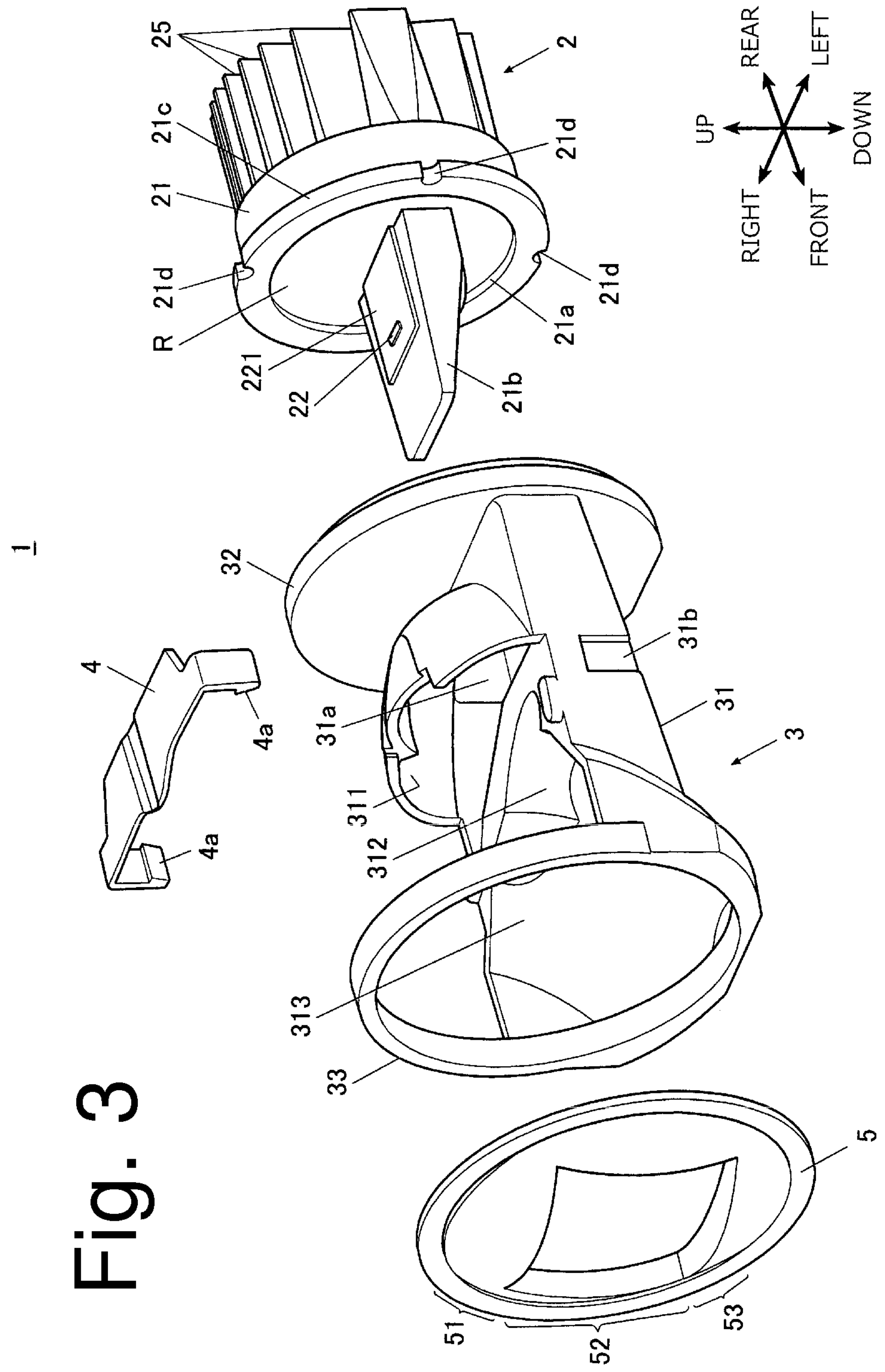
FIG. 3 is an exploded perspective view illustrating the vehicle headlamp of FIG. 2.
Figure 4:
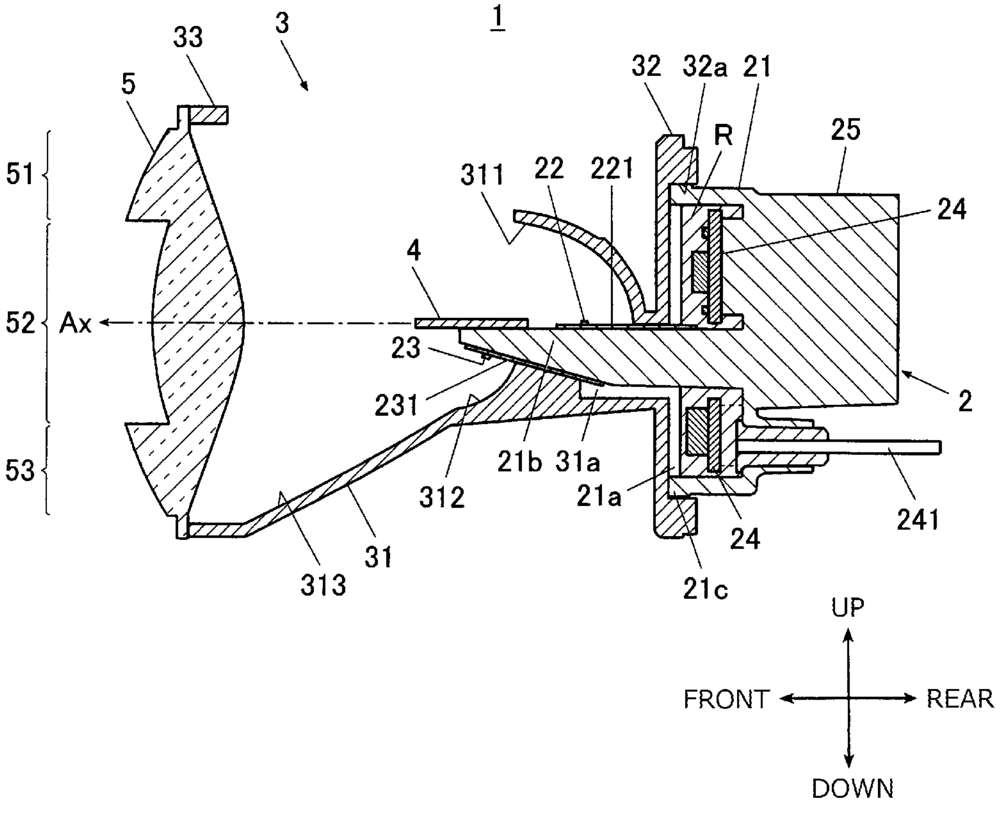
FIG. 4 is a cross-sectional side view illustrating the vehicle headlamp of FIG. 2.
Figure 5:
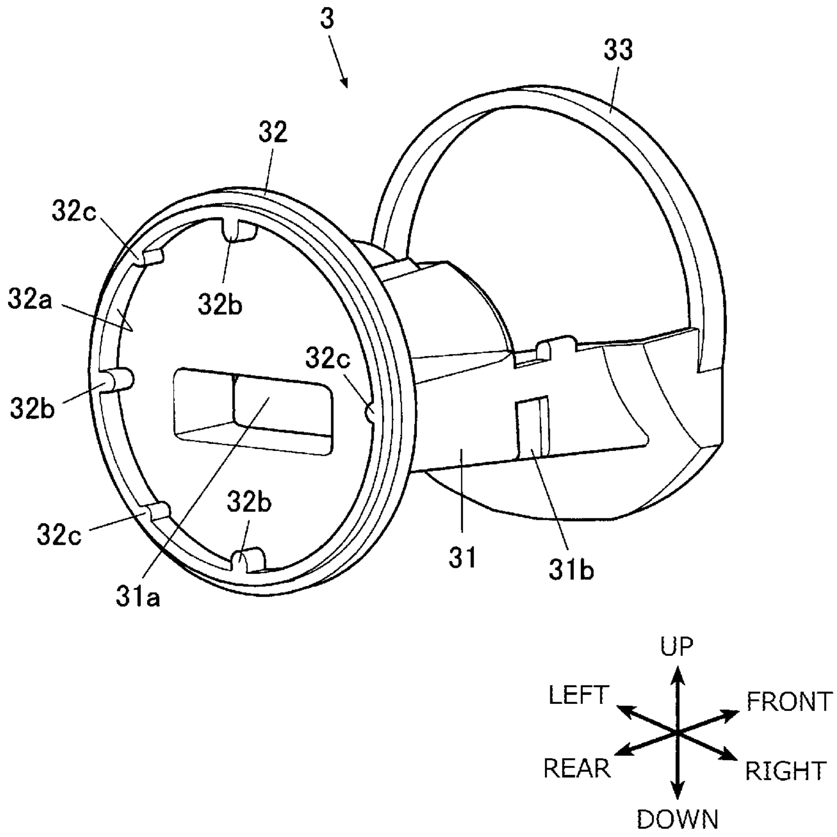
FIG. 5 is a perspective view illustrating a holding member when viewed from its rear side of the vehicle headlamp of FIG. 2.

FIG. 2 is a perspective view illustrating a vehicle headlamp 1 according to an exemplary embodiment, FIG. 3 is an exploded perspective view illustrating the vehicle headlamp 1, FIG. 4 is a cross-sectional side view illustrating the vehicle headlamp 1, and FIG. 5 is a perspective view illustrating a holding member 3 included in the vehicle headlamp 1 when viewed from its rear side.

In the following description, the "forward (front)," "rearward (rear, back)," "left," "right," "upper," and "lower" directions are based on a typical posture of an automobile vehicle body to which the vehicle lighting unit is installed unless otherwise specified, and the directions correspond to the indications in the drawings.

As shown in FIGS. 2 to 4, the vehicle headlamp 1 can be a projector type lighting unit to be installed in the front part of a vehicle body of a vehicle, such as an automobile (not illustrated) and configured to form a desired light distribution pattern (for example, a high-beam light distribution pattern and a low-beam light distribution pattern) in front of the vehicle body. The vehicle headlamp 1 can include a light source module 2, a holding member 3, a shade 4, a projector lens 5, and the like.

The light source module 2 can include a module main body 21 made of metal and a first LED 22 and a second LED 23 to be mounted on the module main body 21 as light sources utilizing semiconductor light emitting devices.

The module main body 21 can have a circular shape when viewed from a front side in the present exemplary embodiment. The circular portion of the module main body 21 can include a recessed portion 21*a* formed in its front surface and recessed rearward, and a planar extension portion 21*b* extending from the bottom center of the recessed portion 21*a* forward.

The first LED 22 can be mounted on a substrate 221, and in this state, can be directly attached onto the upper surface of the planar extension portion 21*b*, with the light emission surface of the first LED 22 directed upward. The lower surface of the extension portion 21*b* can have an inclined front portion as a tapered surface inclined upward and forward at an inclination angle of 15° with respect to the front-to-rear direction (the front-to-rear direction being substantially perpendicular to an optical axis of the first LED 22 which is directed upward in FIG. 4). The second LED 23 can be mounted on a substrate 231, and in this state, can be directly attached onto the tapered lower surface of the planar extension portion 21*b*, with the light emission surface of the second LED 23 directed forward and obliquely downward along the tapered surface. Note that the second LED 23 can be disposed in a frontward direction a predetermined distance away from the first LED 22 when viewed from above as a plan view. The predetermined distance may fall within a range of 5 mm to 30 mm, and preferably be about 20 mm, for example.

The module main body 21 can include drive circuits 24 for the first and second LEDs 22 and 23. The drive circuits 24 can be directly attached to the recessed portion 21*a* at an upper section and a lower section thereof, respectively, with the extension portion 21*b* interposed therebetween. The drive circuits 24 can be sealed with a resin R filled in the recessed portion 21*a*. The resin R can be composed of, for example, a silicon resin material, and can enhance the heat dissipation of the drive circuits 24 and protect the drive circuits 24 against moisture (waterproof property). The drive circuits 24 can be connected with cables 241 for supplying power and control signals, the cables 241 being drawn from the lower portion of the bottom of the recessed portion 21*a* to the outside. The drive circuits 24 can control the first and second LEDs 22 and 23, respectively, on the basis of externally input control signals.

Further, the module main body 21 can have a plurality of heat dissipation fins 25 standing on the rear surface of the module main body 21 and extending rearward and arranged in the horizontal direction. The heat dissipation fins 25 can dissipate the heat that is generated by the first and second LEDs 22 and 23 and the drive circuits 24 and conducted thereto. Accordingly, the module main body 21 having the heat dissipation fins 25 can function as a heat dissipation member for dissipating heat generated by the first and second LEDs 22 and 23 and the drive circuits 24. The extension portion 21*b*, the recessed portion 21*a*, and the heat dissipation fins 25 of the module main body 21 can be formed integrally as a single member of a single continuous metal material having superior heat conductivity. Examples of such a metal material may include an aluminum alloy and the like. With this configuration, the heat generated by the first and second LEDs 22 and 23 and the drive circuits 24 can be conducted to the heat dissipation fins 25 with remarkably less heat-resistance.

The module main body 21 can include a cylindrical flange portion 21*c* at the peripheral edge of the opening of the recessed portion 21*a*. The flange portion 21*c* can be fit to the holding member 3. Specifically, the flange portion 21*c* can have a cylindrical shape with a thin thickness in the front-to-rear direction (having a flange surface formed on a plane perpendicular to the front-to-rear direction) and a plurality of (three in the illustrated exemplary embodiment) notches 21*d* serving as engagement portions in its outer peripheral edge at irregular pitches. The holding member 3 can include a plurality of projections 32*b* serving as engagement portions at corresponding pitches to the irregular pitches so that the module main body 21 of the light source module 2 can be placed in position with respect to the holding member 3 in the peripheral direction (around the center axis in the front-to-rear direction).

The holding member 3 can be configured to hold the light source module 2 and the projector lens 5. The holding member 3 can include a holder main portion 31, and a light source holding portion 32 and a lens holding portion 33 provided at a rear end and a front end of the holder main portion 31, respectively.

The light source holding portion 32 can serve to hold the light source module 2 detachably, and can have a recessed fit portion 32*a* opening rearward with a circular shape. The fit portion 32*a* can be utilized to position the light source module 2 by allowing the flange portion 21*c* of the module main body 21 of the light source module 2 to be fit thereto in the front-to-rear direction. Specifically, the flange portion 21*c* of the light source module 2 can be fit to the fit portion 32*a* from the rear side thereof to be mounted onto the light source holding portion 32 of the holding member 3. Reversely, the flange portion 21*c* fit to the fit portion 32*a* can be removed rearward to detach the light source module 2 from the light source holding portion 32 of the holding member 3. Accordingly, the light source module 2 can be attached to and removed from the light source holding portion 32 in the front-to-rear direction.

Further, as shown in FIG. 5, the fit portion 32*a* of the light source holding portion 32 can include a plurality of (three in the illustrated exemplary embodiment) positioning projections 32*b* serving as engagement portions in the inner peripheral edge of the light source holding portion 32 at corresponding pitches to the above-described irregular pitches. With this configuration, when the plurality of notches 21*d* of the flange portion 21*c* are fit to the corresponding positioning projections 32*b* of the fit portion 32*a*, the light source module 2 can be placed in position in the circumferential direction with respect to the holding member 3. The fit portion 32*a* of the light source holding portion 32 can also include a plurality of (three in the illustrated exemplary embodiment) centering projections 32*c* in the inner peripheral edge of the light source holding portion 32 at peripheral positions different from the positioning projections 32*b*. Here, the centering projections 32*c* can center the flange portion 21*c* by abutting the outer peripheral surface of the flange portion 21*c*.

The holder main portion 31 can have an insertion hole 31*a* in which the extension portion 21*b* of the module main body 21 can be inserted, as shown in FIGS. 2 to 4. The insertion hole 31*a* can be opened at the bottom center of the fit portion 32*a* and penetrate through the holder main portion 31 in the front-to-rear direction so that the extension portion 21*b* of the module main body 21 can be inserted from the rear side thereof. Specifically, when the flange portion 21*c* is fit to the fit portion 32*a* so that the light source module 2 is attached to the holding member 3, the extension portion 21*b* can be simultaneously inserted into the insertion hole 31*a*. In this manner, the first and second LEDs 22 and 23 can be placed in position with respect to the optical system of the vehicle headlamp 1 (including a first reflector 311, a second reflector 312 and a third reflector 313, and the projector lens 5 to be described later).

The upper plate portion continued from the insertion hole 31*a* can be formed into a semi-dome shape and opened forward so that the upper plate portion can cover the top of the first LED 22 disposed on the top surface of the extension portion 21*b* that has been inserted into the insertion hole 31*a*. The lower surface (inner surface) of the upper plate portion can function as the first reflector 311. Accordingly, the first reflector 311 can be provided in the rear half portion of the holder main portion 31. The first reflector 311 can be formed as a free curved surface based on a revolved ellipsoid having a first focal point at or near (i.e., substantially at) the first LED 22 and a second focal point at or near (i.e., substantially at) the front edge of the shade 4 disposed in front of the first reflector 311. The second focal point may be a focal line formed so as to be positioned forward as it is away from the center of the first reflector 311 in the horizontal direction.

The front half portion of the holder main portion 31 from the center in the front-to-rear direction can be formed as a curved recessed shape opened forward and obliquely upward. The upper surface (inner surface) thereof can function as the second reflector 312 and the third reflector 313.

The second reflector 312 can be formed at the center of the holder main portion 31 in the front-to-rear direction so as to cover the second LED 23, which is disposed on the lower surface of the extension portion 21*b*, from below. The second reflector 312 can be a free curved surface based on a revolved ellipsoid having a first focal point at or near (i.e., substantially at) the second LED 23 and a second focal point at a position forward and obliquely upward with respect to the front edge of the shade 4 which is disposed in front. Further, the distance between the first focal point and the second focal point of the second reflector 312 can be designed to be shorter than the distance between the first focal point and the second focal point of the first reflector 311.

The third reflector 313 can be formed in the front half portion of the holder main portion 31 so as to be continued from the second reflector 312 forwardly. The third reflector 313 can be a free curved surface based on a hyperboloid of two sheets having a first focal point at or near (i.e., substantially at) the second LED 23 and a second focal point at a position rearward and obliquely downward with respect to the first focal point.

The lens holding portion 33 can be a holding frame for holding the projector lens 5, and formed to be a circular shape having a center axis in the front-to-rear direction.

The shade 4 can be a substantially planer light-shielding member and attached to the center portion in the front-to-rear direction of the holder main portion 31 so that the lower surface of the shade 4 can abut onto the top front end of the extension portion 21*b*. Specifically, the shade 4 can have right and left engagement projections 4*a* and 4*b* (see FIG. 3), and be attached to the holder main portion 31 by engaging the engagement projections 4*a* and 4*b* with right and left engagement recessed portions 31*b* on both side faces of the holder main portion 31 from above. The shade 4 can have a front half portion formed to project forward from the front end of the extension portion 21*b*, and the second focal point of the first reflector 311 can be positioned at or near (i.e., substantially at) the front edge of the shade 4, as described above. With this configuration, part of light emitted from the first LED 22 and reflected by the first reflector 311 can be blocked by the shade 4, so that the cut-off line C in the low-beam light distribution pattern PL can be formed, which will be described later. (See FIG. 7A.) The top surface of the shade 4 may be subjected to mirror finishing such as aluminum vapor deposition. In this case, the light reflected by the first reflector 311 and incident on the top surface of the shade 4 can be reflected by this top surface of the shade 4 toward a middle lens portion 52 of the projector lens 5, which will be described later. (See FIG. 6A.)

The projector lens 5 can have an optical axis Ax in the front-to-rear direction and can be attached to the lens holding portion 33 so that the first LED 22 and the shade 4 can be positioned on or near (i.e., substantially at) the optical axis Ax of the lens 5. The projector lens 5 can be a bifocal lens and can be composed of an upper lens portion 51, a middle lens portion 52, and a lower lens portion 53 which are integrally molded.

The upper lens portion 51 can be an aspheric convex lens and have a rear focal point positioned at or near (i.e., substantially at) the second focal point of the second reflector 312.

The middle lens portion 52 can be an aspheric convex lens and have a rear focal point positioned at or near (i.e., substantially at) the second focal point of the first reflector 311. The light projection surface (front surface) of the middle lens portion 52 can be divided so as to form a Fresnel cut shape in the horizontal (right-to-left) direction.

The lower lens portion 53 can be an aspheric convex lens and have a rear focal point positioned at or near (i.e., substantially at) the second focal point of the third reflector 313.

Next, a description will be given of the operation of the vehicle headlamp 1.

Figure 6A:
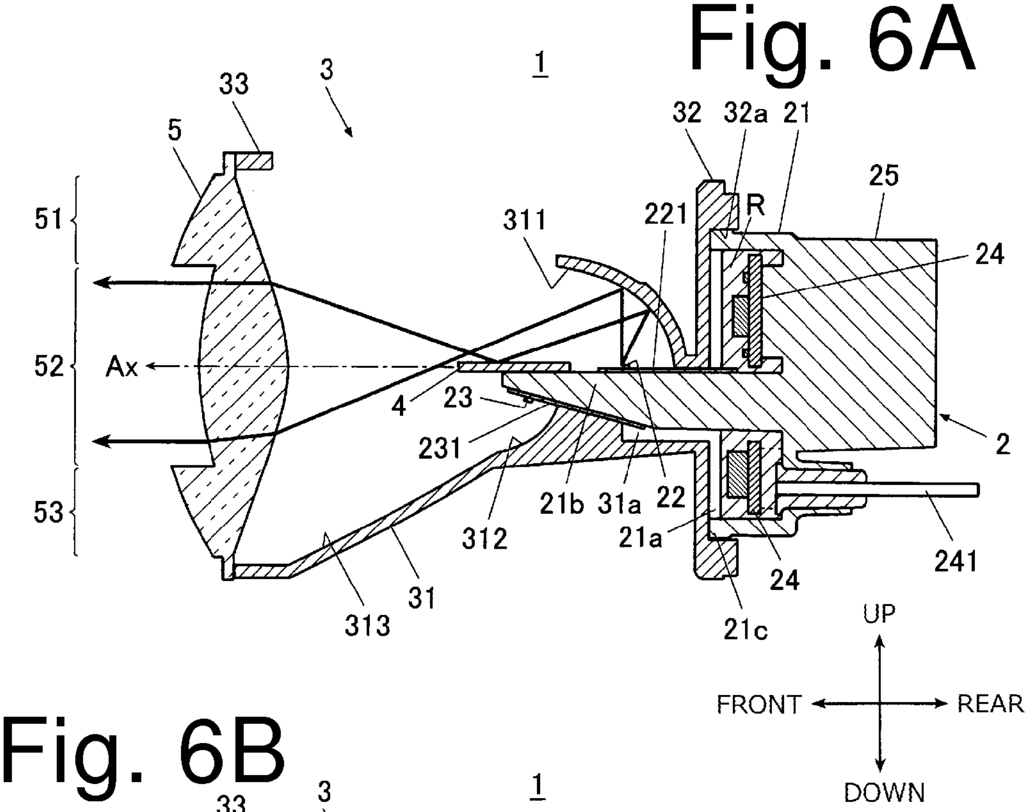
FIGS. 6A and 6B are cross-sectional side views each illustrating optical paths in the vehicle headlamp of FIG. 2.
Figure 6B:
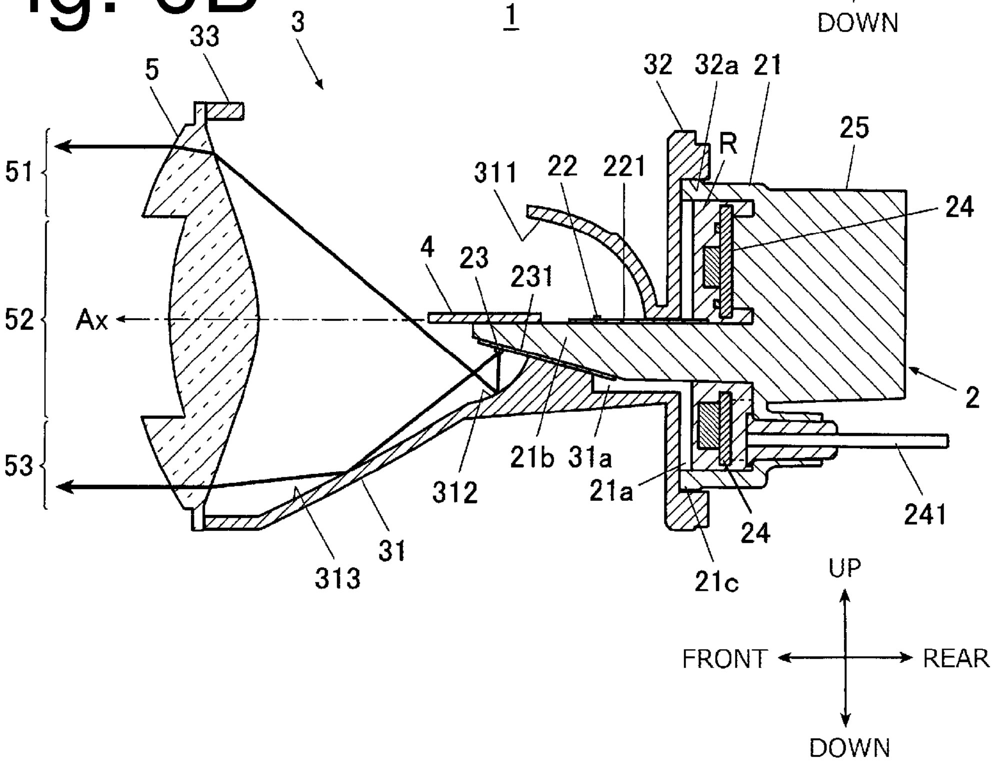
Figure 7A:
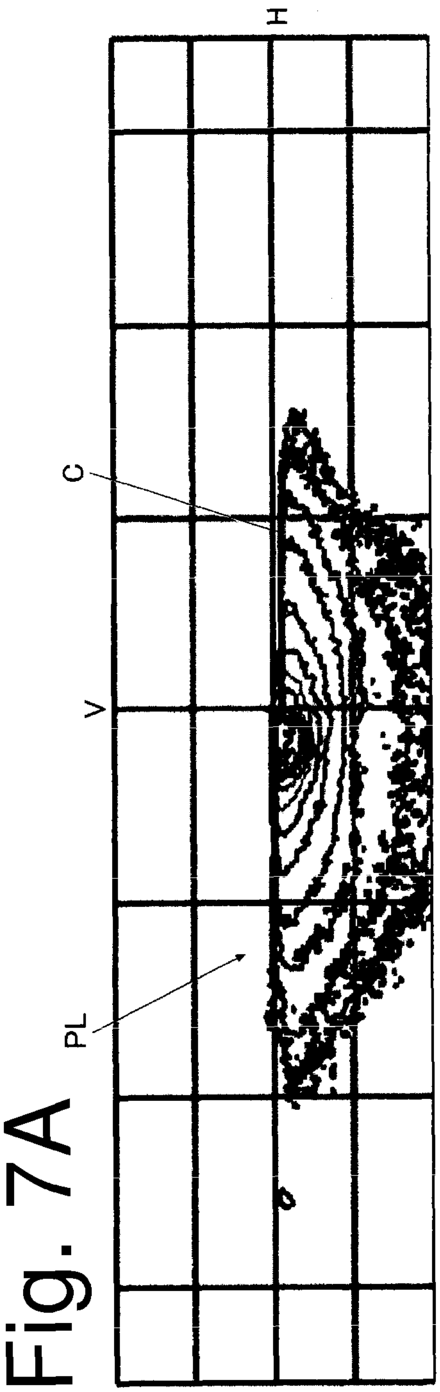
FIGS. 7A and 7B are diagrams illustrating light distribution patterns formed on a virtual screen by the vehicle headlamp of FIG. 2.
Figure 7B:
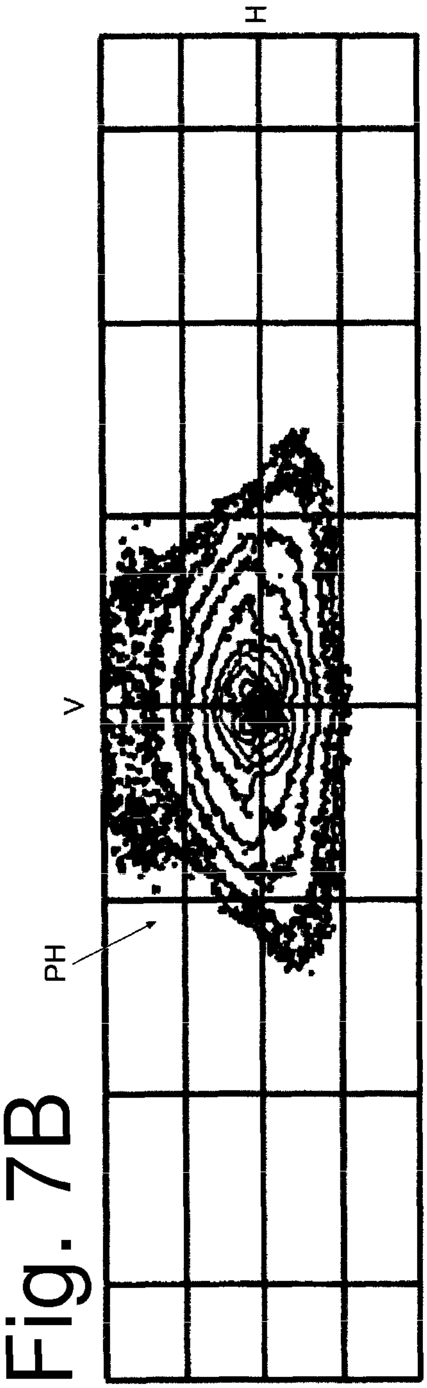

FIGS. 6A and 6B are cross-sectional side views each illustrating optical paths of light during operation the vehicle headlamp 1, and FIGS. 7A and 7B are diagrams illustrating light distribution patterns formed on a virtual screen by the vehicle headlamp 1.

First, as shown in FIG. 6A, suppose the case where the vehicle headlamp 1 is controlled such that the first LED 22 is driven by the drive circuit 24 to be turned on while the second LED 23 is turned off. In this case, the light emitted from the first LED 22 can be reflected forward by the first reflector 311 and inverted and projected forward by the middle lens portion 52 of the projector lens 5. Part of light directed to the lower portion of the middle lens portion 52 can be blocked by the shade 4, so that the irradiated light above the cut-off line C near the horizontal line H can be appropriately shielded. As a result, the desired low-beam light distribution pattern PL can be formed.

On the other hand, when the first LED 22 is turned off and the second LED 23 is turned on by the drive circuits 24 as shown in FIG. 6B, part of the light emitted from the second LED 23 can enter the second reflector 312 and be reflected by the same forward. Then, the light can be inverted and projected forward by the upper lens portion 51. Simultaneously, another part of the light emitted from the second LED 23 can enter the third reflector 313 and be reflected by the same forward. Then, the light can be inverted and projected forward by the lower lens portion 53. In this case, the light entering the upper lens portion 51 and the lower lens portion 53 can be projected forward through the upper lens portion 51 and the lower lens portion 53 without being shielded by the shade 4. Therefore, the projected light can form a high-beam light distribution pattern PH including the upper illumination area above the horizontal line H. Specifically, the light from the upper lens portion 51 can be utilized to be projected over the entire high-beam light distribution pattern PH while the light from the lower lens portion 53 can be utilized to be projected to the high intensity area at the center of the high-beam light distribution pattern PH.

As described above, in the vehicle headlamp 1 with the above configuration, the first LED 22, the second LED 23 and the drive circuits 24 which are the heat generation members can be directly attached to the module main body 21 that has the heat dissipation fins 25. When compared with the conventional vehicle headlamp in which the optical module consisting only of the LED and the drive circuit is fixed to a separate part having a heat dissipation member, the heat from the first and second LEDs 22 and 23 can be prevented from being conducted to the drive circuits 24 and can be directly conducted together with the heat from the drive circuits 24 to the module main body 21 to dissipate from the heat dissipation fins 25 of the module main body 21. Therefore, the first and second LEDs 22 and 23 and the drive circuits 24 can be effectively cooled by heat dissipation as compared to the conventional vehicle headlamp.

In addition to this, since the drive circuits 24 are sealed with a resin, the drive circuits 24 can be waterproof while the heat dissipation performance from the drive circuits 24 can be enhanced.

Furthermore, the first and second LEDs 22 and 23 and the drive circuits 24, which are the heat generation members, can be united as the light source module 2 together with the module main body 21 including the heat dissipation fins 25 to dissipate the generated heat. Furthermore, the light source module 2 can be attached to and removed from the light source holding portion 32 at the rear end of the holding member 3. Since the light source module 2 can be removed from the holding member 3 in a rearward direction, the first and second LEDs 22 and 23 and/or the drive circuits 24 can be easily and simultaneously replaced with a new/replacement structure. This can enhance the maintenance workability more than the conventional lighting unit while the heat generated by the first and second LEDs 22 and 23 and the drive circuits 24 can be appropriately dissipated.

Furthermore, by simply mounting the light source module 2 to the holder member 3, the first LED 22 and the second LED 23 can be precisely positioned with respect to the optical system (including the first reflector 311, the second reflector 312, the third reflector 313, and the projector lens 5). Since the mounting operation of the light source module 2 and the aiming operation (positioning operation) of the first LED 22 and the second LED 23 can be simultaneously performed, the maintenance workability can be further enhanced.

It will be apparent to those skilled in the art that various modifications and variations can be made in the presently disclosed subject matter without departing from the spirit or scope of the presently disclosed subject matter.

In the above exemplary embodiment, the projector type vehicle headlamp 1 has been exemplified as the vehicle lighting unit made in accordance with principles of the presently disclosed subject matter, but a reflector type or a direct projection type vehicle lighting unit can also be employed.

In the above description, it has been described that the first LED 22 is "directly" attached to the extension portion 21*b* of the module main body 21. However, a substrate 221 may be interposed between the first LED 22 and the extension portion 21*b*. The substrate 221 can be a prerequisite member for forming the LED device to achieve light emission from the first LED 22 and can function together with the first LED 22. Furthermore, the substrate 221 may not function as a heat resistance structure, but a superior heat conductor, and even with the substrate 221 intervening between the LED 22 and the extension portion 21*b* the heat can transfer from the LED 22 to the extension portion 21*b* as if there is no intervention structure. In the present description, thus, this shall be deemed that "the first LED 22 is 'directly' attached to the extension portion 21*b*." The same is true for the second LED 23.

The first LED 22 can be disposed so that the light emission surface is directed upward, but this is not limitative. The light emission surface of the first LED 22 may be inclined with respect to the front-to-rear direction if required or desired. For example, the light emission surface of the first LED 22 can be inclined obliquely rearward by an angle of 20° or smaller. By inclining the light emission surface of the first LED 22 within the above angle range so that the light emission surface is allowed to properly face to the first reflector 311, the light flux use efficiency of the first LED 22 can be enhanced in accordance with desired specifications of the lighting unit.

Furthermore, the light emission surface of the second LED 23 can be inclined by 15° with respect to the front-to-rear direction along the tapered surface of the extension portion 21*b*. However, the light emission surface of the second LED 23 may be inclined by an angle of 10° to 30°. By inclining the light emission surface of the second LED 23 within the above angle range in accordance with desired specifications of the lighting unit, the light emitted from the second LED 23 can be properly reflected by the second reflector 312 and the third reflector 313 so as to be directed to the upper lens portion 51 and the lower lens portion 53.

In the above exemplary embodiment, the first to third reflectors 311, 312, and 313 can be formed in the holding member 3, but they may be formed as individual separate parts to be attached to the holding member 3. Further, the holding member 3 and the shade 4 may be integrally formed as a single part. What is of importance with regard to these members is the physical relationship between these members when and if implemented in the lighting device. As these members are not involved in the heat conduction, they may or may not be integrally formed.

Figure 8:
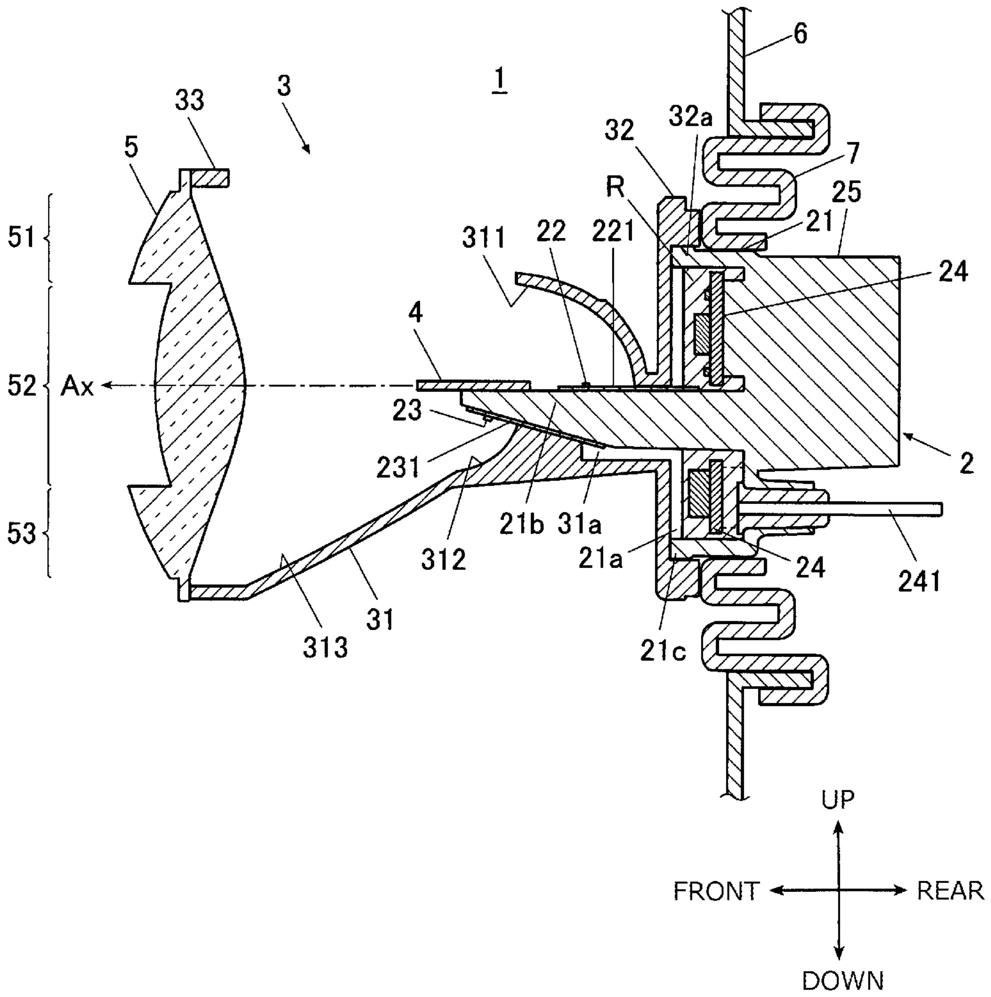
FIG. 8 is a cross-sectional side view illustrating the vehicle headlamp of FIG. 2.

When the vehicle headlamp 1 is housed within a housing 6, as shown in FIG. 8, a flexible member 7 can be disposed between the vehicle headlamp 1 and the housing 6 so that the heat dissipation fins 25 are exposed to the outside on the rear side. This configuration can facilitate the compactness of the housing 6 while the heat dissipation performance of the heat dissipation fins 25 can be enhanced.

In the above exemplary embodiment, the two LEDs, or the first LED 22 and the second LED 23, are used to form two distinct light distribution patterns (low-beam light distribution pattern PL and high-beam light distribution pattern PH). However, the presently disclosed subject matter can be applied to a vehicle lighting unit in which a single LED can form a single light distribution pattern.

Furthermore, the semiconductor light emitting device used in the vehicle lighting unit can be a semiconductor laser device and the like in addition to a light emitting diode (LED).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit, comprising:
a semiconductor light emitting device;
a drive circuit configured to drive and control the semiconductor light emitting device; and
a heat dissipation member to which both the semiconductor light emitting device and the drive circuit are directly attached in order to dissipate heat generated by the semiconductor light emitting device and the drive circuit,
wherein the drive circuit is sealed with a resin.

2. The vehicle lighting unit according to claim 1, wherein
the heat dissipation member includes
a front surface with a recessed portion having a bottom,
an extension portion integrally formed with and extending forward from the bottom of the recessed portion, and
a rear surface integrally formed with the extension portion and including a heat dissipation fin integrally formed in the rear surface,
the semiconductor light emitting device is attached to the extension portion, and
the drive circuit is attached within the recessed portion.

3. The vehicle lighting unit according to claim 1, wherein
the heat dissipation member includes an extension portion extending forward,
the semiconductor light emitting device includes a first semiconductor light emitting device configured to form a low-beam light distribution pattern, and a second semiconductor light emitting device configured to form a high-beam light distribution pattern, and
the extension portion has an upper surface to which the first semiconductor light emitting device is attached and a lower surface to which the second semiconductor light emitting device is attached.

4. The vehicle lighting unit according to claim 2, wherein
the semiconductor light emitting device includes a first semiconductor light emitting device configured to form a low-beam light distribution pattern, and a second semiconductor light emitting device configured to form a high-beam light distribution pattern, and
the extension portion has an upper surface to which the first semiconductor light emitting device is attached and a lower surface to which the second semiconductor light emitting device is attached.

5. A vehicle lighting unit, comprising:
a semiconductor light emitting device;
a drive circuit configured to drive and control the semiconductor light emitting device; and
a heat dissipation member to which both the semiconductor light emitting device and the drive circuit are directly attached in order to dissipate heat generated by the semiconductor light emitting device and the drive circuit, wherein
the heat dissipation member includes
a front surface with a recessed portion having a bottom,
an extension portion integrally formed with and extending forward from the bottom of the recessed portion, and
a rear surface integrally formed with the extension portion and including a heat dissipation fin integrally formed in the rear surface,
the semiconductor light emitting device is attached to the extension portion, and
the drive circuit is attached within the recessed portion.

6. The vehicle lighting unit according to claim 5, wherein
the semiconductor light emitting device includes a first semiconductor light emitting device configured to form a low-beam light distribution pattern, and a second semiconductor light emitting device configured to form a high-beam light distribution pattern, and
the extension portion has an upper surface to which the first semiconductor light emitting device is attached and a lower surface to which the second semiconductor light emitting device is attached.

7. A vehicle lighting unit, comprising:
a semiconductor light emitting device;
a drive circuit configured to drive and control the semiconductor light emitting device; and
a heat dissipation member to which both the semiconductor light emitting device and the drive circuit are directly attached in order to dissipate heat generated by the semiconductor light emitting device and the drive circuit, wherein
the heat dissipation member includes an extension portion extending forward,
the semiconductor light emitting device includes a first semiconductor light emitting device configured to form a low-beam light distribution pattern, and a second semiconductor light emitting device configured to form a high-beam light distribution pattern, and
the extension portion has an upper surface to which the first semiconductor light emitting device is attached and a lower surface to which the second semiconductor light emitting device is attached.

8. A vehicle lighting unit, comprising:
a light source module having a first semiconductor light emitting device and a second semiconductor light emitting device, a drive circuit configured to drive and control the first and second semiconductor light emitting devices, a heat dissipation member configured to dissipate heat generated by the first and second semiconductor light emitting devices and the drive circuit, and an extension portion extending forward and having an upper surface to which the first semiconductor light emitting device is attached and a lower surface to which the second semiconductor light emitting device is attached in order to cause the first and second semiconductor light emitting devices to form independent light distribution patterns;
an optical system configured to project light emitted from the first and second semiconductor light emitting devices forward; and a holding member configured to hold the optical system and detachably hold the light source module at a rear end of the holding member.

9. The vehicle lighting unit according to claim 8, wherein the light source module is attachable to and removable from the rear end of the holding member in a front-to-rear direction.

10. The vehicle lighting unit according to claim 8, wherein the first and second semiconductor light emitting devices are positioned with respect to the optical system by fitting the light source module to the holding member.

11. The vehicle lighting unit according to claim 9, wherein the first and second semiconductor light emitting devices are positioned with respect to the optical system by fitting the light source module to the holding member.

12. The vehicle lighting unit according to claim 8, wherein the light source module includes a cylindrical flange portion with a thin thickness in the front-to-rear direction, the holding member includes a circular fit portion at the rear end to be fit to the flange portion; and the flange portion includes a plurality of engagement portions in a peripheral edge of the flange portion at irregular pitches, and the fit portion includes a plurality of engagement portions in a peripheral edge of the fit portion at corresponding pitches to the irregular pitches so that the plurality of engagement portions of the flange portion can be fit to the corresponding engagement portions of the fit portion.

13. The vehicle lighting unit according to claim 9, wherein the light source module includes a cylindrical flange portion with a thin thickness in the front-to-rear direction, the holding member includes a circular fit portion at the rear end to be fit to the flange portion; and the flange portion includes a plurality of engagement portions in a peripheral edge of the flange portion at irregular pitches, and the fit portion includes a plurality of engagement portions in a peripheral edge of the fit portion at corresponding pitches to the irregular pitches so that the plurality of engagement portions of the flange portion can be fit to the corresponding engagement portions of the fit portion.

14. The vehicle lighting unit according to claim 10, wherein the light source module includes a cylindrical flange portion with a thin thickness in the front-to-rear direction, the holding member includes a circular fit portion at the rear end to be fit to the flange portion; and the flange portion includes a plurality of engagement portions in a peripheral edge of the flange portion at irregular pitches, and the fit portion includes a plurality of engagement portions in a peripheral edge of the fit portion at corresponding pitches to the irregular pitches so that the plurality of engagement portions of the flange portion can be fit to the corresponding engagement portions of the fit portion.

15. The vehicle lighting unit according to claim 11, wherein the light source module includes a cylindrical flange portion with a thin thickness in the front-to-rear direction, the holding member includes a circular fit portion at the rear end to be fit to the flange portion; and the flange portion includes a plurality of engagement portions in a peripheral edge of the flange portion at irregular pitches, and the fit portion includes a plurality of engagement portions in a peripheral edge of the fit portion at corresponding pitches to the irregular pitches so that the plurality of engagement portions of the flange portion can be fit to the corresponding engagement portions of the fit portion.

16. The vehicle lighting unit according to claim 8, wherein the first semiconductor light emitting device is configured to form a low-beam light distribution pattern, and the second semiconductor light emitting device is configured to form a high-beam light distribution pattern.

17. The vehicle lighting unit according to claim 9, wherein the first semiconductor light emitting device is configured to form a low-beam light distribution pattern, and the second semiconductor light emitting device is configured to form a high-beam light distribution pattern.

18. The vehicle lighting unit according to claim 10, wherein the first semiconductor light emitting device is configured to form a low-beam light distribution pattern, and the second semiconductor light emitting device is configured to form a high-beam light distribution pattern.

19. The vehicle lighting unit according to claim 11, wherein the first semiconductor light emitting device is configured to form a low-beam light distribution pattern, and the second semiconductor light emitting device is configured to form a high-beam light distribution pattern.

20. The vehicle lighting unit according to claim 12, wherein the first semiconductor light emitting device is configured to form a low-beam light distribution pattern, and the second semiconductor light emitting device is configured to form a high-beam light distribution pattern.

21. The vehicle lighting unit according to claim 16, wherein the second semiconductor light emitting device is arranged in an inclined state with respect to the upper surface so that a light emission surface of the second semiconductor light emitting device is directed forward and obliquely downward.

22. The vehicle lighting unit according to claim 17, wherein the second semiconductor light emitting device is arranged in an inclined state with respect to the upper surface so that a light emission surface of the second semiconductor light emitting device is directed forward and obliquely downward.

23. The vehicle lighting unit according to claim 18, wherein the second semiconductor light emitting device is arranged in an inclined state with respect to the upper surface so that a light emission surface of the second semiconductor light emitting device is directed forward and obliquely downward.

24. The vehicle lighting unit according to claim 16, wherein the second semiconductor light emitting device is disposed further forward than the first semiconductor light emitting device.

25. The vehicle lighting unit according to claim 21, wherein the second semiconductor light emitting device is disposed further forward than the first semiconductor light emitting device.

* * * * *